(12) United States Patent
Robertson et al.

(10) Patent No.: US 8,109,759 B2
(45) Date of Patent: Feb. 7, 2012

(54) ASSURED COMPLIANCE MODE OF OPERATING A COMBUSTION SYSTEM

(75) Inventors: Thomas F. Robertson, Medina Township, OH (US); Thomas B. Neville, Incline Village, NV (US); Charles E. Kilfoyle, Chardon, OH (US); John J. Nowakowski, Valley View, OH (US)

(73) Assignee: Fives North America Combustion, Inc., Cleveland, OH (US)

( * ) Notice: Subject to any disclaimer, the term of this patent is extended or adjusted under 35 U.S.C. 154(b) by 1684 days.

(21) Appl. No.: 11/392,005

(22) Filed: Mar. 29, 2006

(65) Prior Publication Data

US 2007/0227125 A1    Oct. 4, 2007

(51) Int. Cl.
*F23N 1/02* (2006.01)
(52) U.S. Cl. ......... 431/18; 431/76; 431/12; 236/15 BB
(58) Field of Classification Search ............. 431/12, 431/18, 115, 116, 9, 76; 236/15 R, 15 BR, 236/15 BB; 123/359, 339.15, 690, 406.13, 123/479, 568.16
See application file for complete search history.

(56) References Cited

U.S. PATENT DOCUMENTS

| | | | |
|---|---|---|---|
| 3,291,969 A * | 12/1966 | Speransky et al. ............. 219/503 |
| 3,396,375 A * | 8/1968 | Low ............................... 340/507 |
| 3,450,343 A * | 6/1969 | Donath ......................... 236/46 R |
| 4,075,059 A * | 2/1978 | Bruno et al. ................... 376/217 |
| 4,260,363 A * | 4/1981 | Cratin, Jr. ....................... 431/76 |
| 4,439,138 A | 3/1984 | Craig et al. |
| 4,492,559 A | 1/1985 | Pocock |
| 4,516,929 A | 5/1985 | Hiroi et al. |
| 4,568,266 A | 2/1986 | Bonne |
| 4,852,384 A * | 8/1989 | Woolbert et al. .............. 73/1.07 |
| 4,885,573 A * | 12/1989 | Fry et al. ....................... 340/519 |
| 4,942,832 A | 7/1990 | Finke |
| 5,191,313 A * | 3/1993 | Galbraith ...................... 340/501 |
| 5,280,756 A | 1/1994 | Labbe |
| 5,314,127 A * | 5/1994 | Coulthard ..................... 241/222 |
| 5,528,639 A * | 6/1996 | Eckert et al. .................. 376/216 |
| 5,605,452 A | 2/1997 | Robertson et al. |
| 5,970,426 A | 10/1999 | Mandel et al. |
| 5,997,280 A * | 12/1999 | Welz et al. ..................... 431/90 |
| 6,401,708 B1 * | 6/2002 | Kim et al. ................. 126/116 A |
| 6,712,604 B2 * | 3/2004 | Havlena ......................... 431/12 |

(Continued)

FOREIGN PATENT DOCUMENTS

CN        1525073 A  *  9/2004

OTHER PUBLICATIONS

"Alternate Monitoring for Rule 4305," San Joaquin Valley Unified Air Pollution Control District, Nov. 6, 1997, pp. RUL7-1 through RUL7-16.
Written Opinion of the International Searching Authority, dated Sep. 17, 2008, 4 pages.

*Primary Examiner* — Steven B McAllister
*Assistant Examiner* — Desmond Peyton
(74) *Attorney, Agent, or Firm* — Jones Day

(57) ABSTRACT

A combustion system is operated with reference to compliant values of a governmentally regulated exhaust emission parameter. If an alarm condition is detected during an ordinary mode of operation, the combustion system is shifted into an assured compliance mode of operation. The shift to the assured compliance mode is made while continuing to operate the combustion system without a shut-down interruption.

23 Claims, 2 Drawing Sheets

U.S. PATENT DOCUMENTS

| | | |
|---|---|---|
| 6,882,929 B2 | 4/2005 | Liang et al. |
| 7,349,794 B2 * | 3/2008 | Malone et al. ................. 701/112 |
| 7,551,418 B2 * | 6/2009 | Ran et al. ...................... 361/103 |
| 2004/0185398 A1 | 9/2004 | Butler |
| 2005/0089811 A1 | 4/2005 | Jelinek |
| 2005/0096757 A1 | 5/2005 | Frerichs et al. |

* cited by examiner

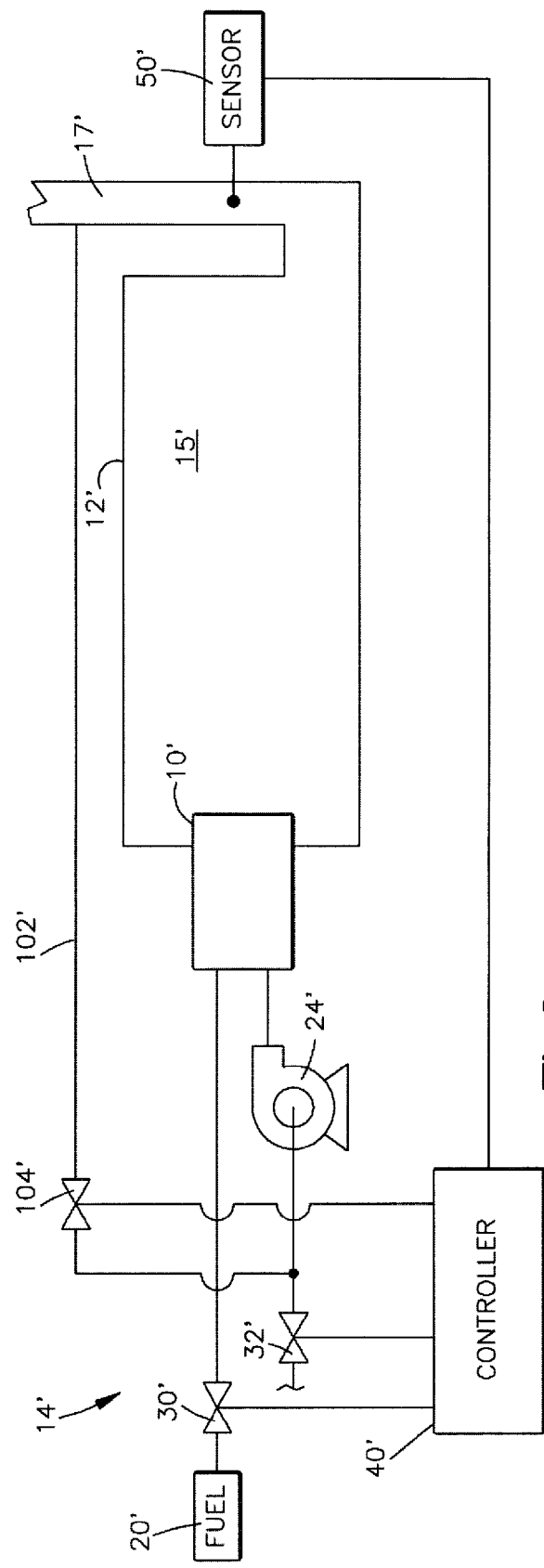
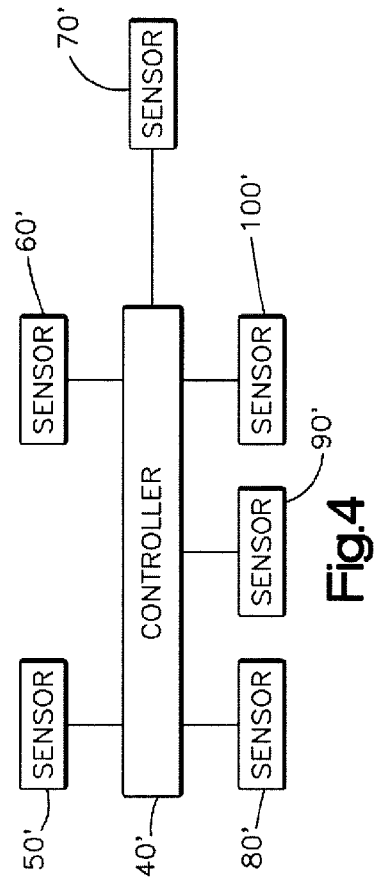
Fig.3
Fig.4

ASSURED COMPLIANCE MODE OF OPERATING A COMBUSTION SYSTEM

TECHNICAL FIELD

This technology relates to combustion systems for industrial heating plants.

BACKGROUND

Industrial heating plants such as boilers, steam generators, dryers and process heaters have combustion systems that produce exhaust emissions. The exhaust emissions may be subject to governmental regulations. Such regulations may require the operator of the heating plant to shut down a heating process upon discovering that an exhaust emission parameter has a non-compliant value above a maximum permitted value. The operator must then take corrective action before resuming the heating process.

SUMMARY

The claimed invention provides a method of operating a combustion system with reference to compliant values of a governmentally regulated exhaust emission parameter.

In its fullest extent the method includes the initial step of specifying a low compliant value below the maximum compliant value. Exhaust is then generated in a preliminary mode of operation by operating a reference combustion system with reactant flow rates that produce available heat. The available heat and the regulated emission parameter are measured in the preliminary mode of operation. Those measurements are used to identify a low range of available heat at which the regulated emission parameter of the exhaust is not greater than the low compliant value.

An ordinary mode of operation follows the preliminary mode. Exhaust is generated in the ordinary mode of operation by operating a user combustion system with reactant flow rates that produce available heat in a target range above the low range. If an alarm condition is detected during the ordinary mode of operation, the user combustion system is shifted into an assured compliance mode of operation. This is done while continuing to operate the user combustion system without a shut-down interruption. The shift into the assured compliance mode is accomplished by reducing the available heat from within the target range to within the low range.

Preferably, while the user combustion system continues to be operated without a shut-down interruption, the alarm condition is corrected and the user combustion system is subsequently shifted back from the assured compliance mode of operation to an ordinary mode of operation by increasing the available heat from within the low range to within the target range.

The reference combustion system and the user combustion system are preferably the same system, but could be different systems. The claimed invention further provides a method of retrofitting a combustion system by rendering it operative to perform as claimed. It follows that the invention further includes a retrofitted apparatus as well as an originally constructed apparatus that is operative as recited in the claims.

BRIEF DESCRIPTION OF THE DRAWINGS

FIGS. 3 and 4 are similar to FIGS. 1 and 2, but show a reference apparatus.

DETAILED DESCRIPTION

Figure 1:
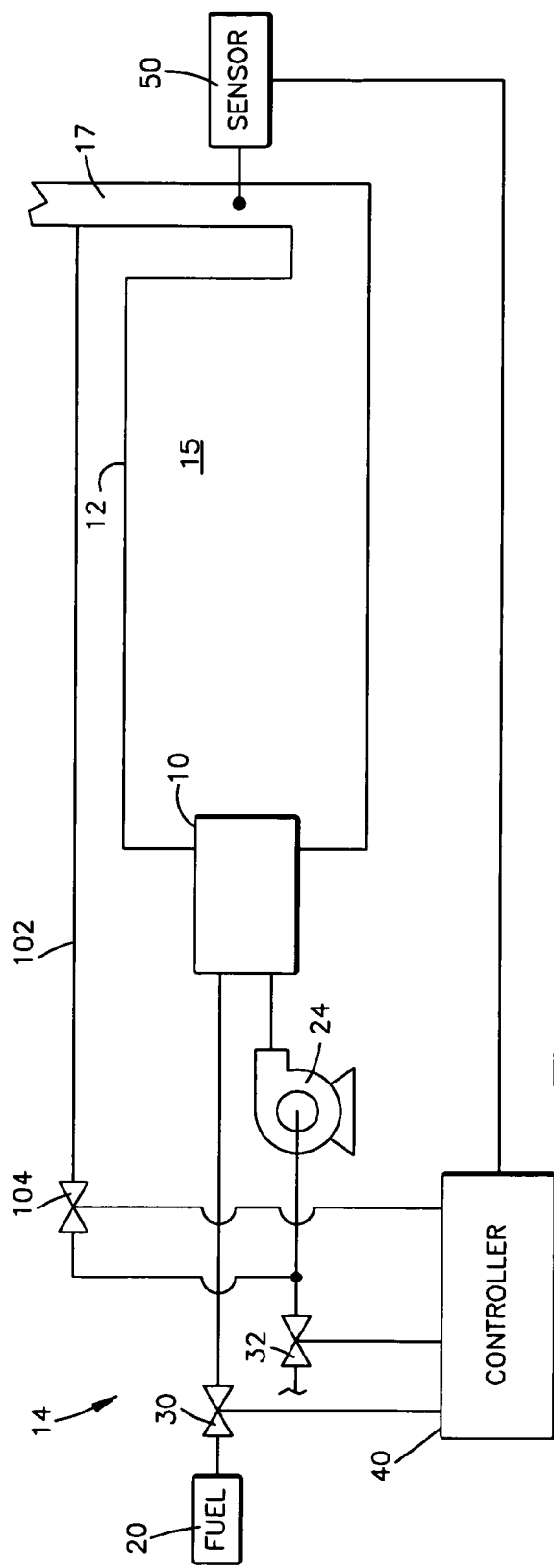
FIG. 1 is a schematic view showing parts of an industrial heating apparatus having a combustion chamber, a combustion system including a burner that fires into the combustion chamber, and a flue that discharges exhaust from the combustion chamber to the atmosphere.

The apparatus shown schematically in the drawings can be operated in steps that are examples of the elements recited in the method claims, and has parts that are examples of the elements recited in the apparatus claims. The following description thus includes examples of how a person of ordinary skill in the art can make and use the claimed invention. It is presented here to meet the requirements of enablement and best mode without imposing limitations that are not recited in the claims. The various parts, as shown, described, and claimed, may be of either original or retrofitted construction as required to accomplish any particular implementation of the invention.

The parts that are shown schematically in FIG. 1 include a burner 10 in an industrial heating plant 12 for which the exhaust emissions are subject to governmental regulation. Such plants include, for example, boilers, steam generators, dryers, and process heaters. The burner 10 is part of a combustion system 14 that is operative to fire into a combustion chamber 15 containing the load (not shown) to be heated. A flue 17 discharges the exhaust from the combustion chamber 15 to the atmosphere.

A fuel source 20, which is preferably a supply of natural gas, and an oxidant source 24, which is preferably an air blower, provide the burner 10 with streams of those reactants. The burner 10 communicates with the fuel source 20 through a fuel control valve 30. The blower 24 communicates with the ambient atmosphere through an oxidant control valve 32.

Other parts of the combustion system 14 include a controller 40 that is operatively associated with the valves 30 and the 32, and a sensor 50 that is operatively associated with the flue 17. The controller 40 has hardware and/or software that is configured for operation of the burner 10. The controller 40 may thus comprise any suitable programmable logic controller or other control device, or combination of control devices, that is programmed or otherwise configured to perform as recited in the claims. As the controller 40 carries out those instructions, it actuates the valves 30 and 32 to initiate, regulate, and terminate flows of reactant streams that cause the burner 10 to fire into the combustion chamber 15.

The controller 40 provides the burner 10 with reactant streams at controlled flow rates. In an ordinary mode of operation, the flow rates of the reactant streams are controlled to be appropriate for the amount of available heat needed for the industrial heating process to be performed in the chamber 15, and also to have a fuel-to-oxidant ratio within a target range. Available heat is defined as the gross quantity of heat released within a combustion chamber minus both the dry flue gas loss and the moisture loss. It represents the quantity of heat remaining for useful purposes and to balance losses to walls, openings, or conveyors, etc. The target range of fuel-to-oxidant ratios is determined with reference to predetermined flow rate data indicating that the exhaust produced by combustion of the reactant streams will contain oxides of nitrogen (NOx) at levels that are likewise within a target range. The target range of NOx levels is below a threshold alarm level which, in turn, is below a maximum level permitted in compliance with an applicable governmental regulation.

The sensor 50 is responsive to the composition of the exhaust in the flue 17. The sensor 50 could sense and indicate NOx content directly. Alternatively, the sensor 50 could sense a different component of the exhaust, such as oxygen, and thus indicate NOx content by implication. In the latter case, the controller 40 would be configured to infer the NOx content of the exhaust based on a known relationship of NOx to total oxygen. In either case, the controller 40 measures the NOx content of the exhaust based on input from the sensor 50, and compares the measured NOx content with the target range of NOx levels that are expected to result from the target range of fuel-to-oxidant ratios at the burner 10. If the measured NOx level is above the target range of NOx levels, the controller 40 generates an alarm signal.

In addition to the alarm signal that indicates NOx above the target range, the controller 40 is further operative to generate alarm signals that indicate other alarm conditions. As shown schematically in FIG. 2, the controller 40 is operatively associated with other sensors in addition to the sensor 50 as described above. That sensor 50 provides the controller 40 with input that directly or indirectly indicates the amount of NOx in the exhaust in the flue 17. At least one other sensor 60 similarly provides the controller 40 with input that directly or indirectly indicates the amount of a different exhaust component such as, for example, CO. The controller 40 measures the CO content of the exhaust based on input from the other sensor 60, and compares the measured CO content with a target range of CO levels that are expected to result from the target range of fuel-to-oxidant ratios at the burner 10. If the measured CO level is above the target range of CO levels, the controller 40 generates an alarm signal.

Figure 2:
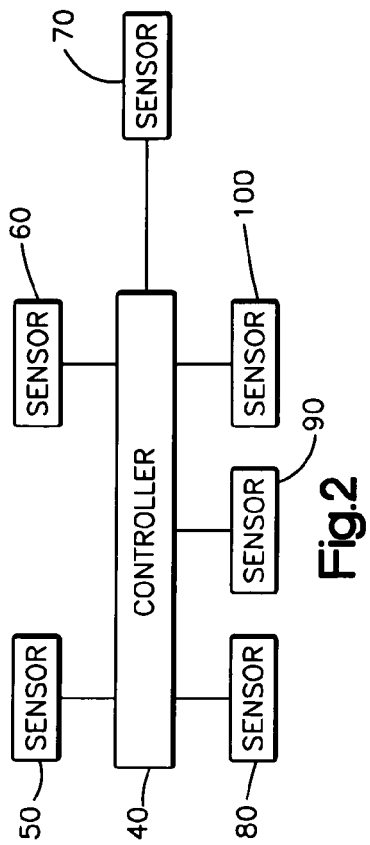
FIG. 2 is a schematic view showing additional parts of the apparatus of FIG. 1.

The additional sensors that are shown as examples in FIG. 2 include a fuel composition sensor 70, a fuel flow rate sensor 80, and an oxidant flow rate sensor 90. Also shown in FIG. 2 is an exhaust temperature sensor 100. These sensors 70, 80, 90, and 100, as well as the sensors 50 and 60 described above, are known devices. The exhaust sensors 50, 60 and 100 are operatively associated with the flue 17, as indicted by the sensor 50 shown in FIG. 1. The other sensors 70, 80 and 90 can be installed in the apparatus of FIG. 1 at any suitable locations known in the art. In accordance with the claimed invention, the controller 40 can generate an alarm signal if input from the fuel composition sensor 70 indicates an unacceptable change in fuel composition. The controller 40 can also generate an alarm signal indicating an unacceptable change in a reactant flow rate through a control valve 30 or 32, as indicated by input from the corresponding flow rate sensor 80 or 90. Input from the exhaust temperature sensor 100 might also prompt an alarm signal from the controller 40. Moreover, the controller 40 can generate an alarm signal in response to input from any of the sensors 50-100, or from any other device with which the controller 40 is operatively associated in the combustion system 14, if that input indicates a malfunction of the respective device.

The alarm signal generated by the controller 40 might indicate that the detected alarm condition is relatively minor. For example, an alarm signal responding to input from the exhaust content sensor 50 might indicate that the measured level of NOx in the exhaust exceeds a specified threshold alarm level that is higher than the target range but complies with the governmental regulation. If so, the controller 40 continues to fire the burner 10 in the ordinary operating mode by providing the burner 10 with reactant streams having fuel-to-oxidant ratios within the target range. However, the alarm signal generated by the controller 40 might indicate that the measured level of NOx in the exhaust approaches or exceeds the maximum compliant level. If so, the burner 10 continues to be fired without a shutdown interruption, but the controller 40 shifts from the ordinary operating mode to an assured compliance mode in which the exhaust generated by the burner 10 contains NOx at levels below the specified threshold alarm level.

The controller 40 can shift the combustion system 14 into an assured compliance mode by reducing the available heat in the chamber 15 such that NOx production will be reduced to a level below the level at which the alarm signal was generated. The controller 40 can measure available heat in a known manner, and the reduction can be accomplished by any operating technique or condition that is known to reduce available heat. For example, the controller 40 can calculate available heat from input received from the exhaust oxygen sensor 50, the fuel flow rate sensor 80, and the exhaust temperature sensor 100. Additional input from the other sensors 60, 70, and 90 also could be used in the calculation of available heat in a known manner. Techniques for reducing the available heat include delivering steam or recirculated flue gas to the burner 10 as a diluent. This could be accomplished by the use of a flue gas recirculation (FGR) line 102 with an FGR valve 104. In a preferred implementation of the claimed invention, the reduction in available heat is accomplished by actuating the fuel and oxidant control valves 30 and 32 to reduce the fuel-to-oxidant ratio at the burner 10. That ratio is reduced to a value below the target range sufficiently to reduce the NOx content of the exhaust to a compliant level that is below the specified threshold alarm level, and is thus well below the maximum compliant level. For example, the reduced level of NOx content could be about 75% of the maximum compliant level.

Shifting into an assured compliance mode enables the burner 10 to continue firing into the combustion chamber 15 without a shut-down interruption that otherwise would be necessary to avoid NOx emissions above the maximum compliant level. The industrial heating process performed by the plant 12 can then be continued without a shut-down interruption while the operator examines the plant 12 to identify a cause for the non-compliant level of NOx. If the cause can be corrected without shutting down the combustion system 14, the assured compliance mode enables the heating process to be continued still further without a shut-down interruption while the operator makes a correction and, in this example, subsequently actuates the controller 40 to shift the combustion system 14 back from the assured compliance mode to an ordinary operating mode by increasing the fuel-to-oxidant ratio at the burner 10 to a value within the target range.

The foregoing example proposes that an assured compliance mode can be reached by reducing the available heat in the chamber 15 to a value at which the exhaust NOx is well below the maximum compliant level. In order to shift into an assured compliance mode in this manner, the controller 40 would require a predetermined reference value of low available heat to which the measured value of available heat must be reduced. The reference value of low available heat would preferably be established empirically. In the given example it could be established by first specifying a low compliant level of NOx to be produced in the assured compliance mode. The burner 10 would then be fired in a preliminary operating mode in which a low range of available heat is identified. Specifically, the burner 10 would be fired with reactant flow rates that produce NOx at or below the specified low compliant level, as measured by the controller 40 with input from the sensor 50 at the flue 17. The available heat in the chamber 15 would be measured at those flow rates to identify a low range of available heat at which NOx production will not exceed the specified low compliant level. Accordingly, that low range of available heat could then serve as the reference to which the measured available heat can be reduced to accomplish a shift into the assured compliance mode.

In the foregoing example, the preliminary mode of operation that establishes the reference range of available heat is performed by the same combustion system 14 that later uses the reference range in an assured compliance mode. However, it is not considered necessary to use a single combustion system as both the reference system and the user system. A suitable reference system could be operated in the preliminary mode to establish a low range of available heat for an assured compliance mode in one or more other user systems. Such a reference system 14' is shown in FIGS. 3 and 4.

The heating plant 12 can be constructed such that the combustion system 14 is originally configured to operate with an assured compliance mode. Alternatively, a heating plant with an existing combustion system that is not configured to operate with an assured compliance mode can be retrofitted to do so. This could be accomplished by operating either the existing combustion system or a different reference system in a preliminary operating mode to establish an assured compliance mode in the manner described above. The existing combustion system could then be configured to operate in an ordinary operating mode with the capability of shifting into the assured compliance mode that was established in the preliminary operating mode.

The patentable scope of the invention is defined by the claims, and may include other examples of how the invention can be made and used. In this regard, the schematic illustration of FIG. 1 shows a burner system in which two reactant streams are delivered to a single burner 10, but the claimed invention can be practiced with a burner system that includes a plurality of burners, and the fuel-to-oxidant ratio could be defined in whole or in part by staged reactants. Moreover, a particular heating process may include operating modes in which some or all of a plurality of burners are cycled on and off in accordance with predetermined conditions of time, temperature and/or other heating process parameters. The assured compliance mode for any particular heating process can include any such burner firing interruptions without including a shut-down interruption of the burner system that would terminate the heating process. Such other examples, which may be available either before or after the application filing date, are intended to be within the scope of the claims if they have structural or method elements that do not differ from the literal language of the claims, or if they have equivalent structural or method elements with insubstantial differences from the literal language of the claims.

The invention claimed is:

1. A method comprising:
   a) specifying a low compliant level of a regulated emission parameter that is below a maximum level permitted in compliance with a governmental regulation;
   b) generating exhaust in a preliminary mode by operating a reference combustion system with reactant flow rates that produce available heat;
   c) measuring the available heat generated in the preliminary mode;
   d) measuring the regulated emission parameter of the exhaust generated in the preliminary mode;
   e) identifying a low range of the measured available heat in which the measured emission parameter is not greater than the low compliant level;
   f) generating exhaust in an ordinary mode by operating a user combustion system with reactant flow rates that produce available heat in a target range above the low range;
   g) detecting an alarm condition during the ordinary mode; and
   h) while continuing to operate the user combustion system without a shut-down interruption, responding to the alarm condition by shifting the user combustion system from the ordinary mode to an assured compliance mode by reducing the available heat from within the target range to within the low range.

2. A method as defined in claim 1 wherein a single combustion system is operated as both the reference combustion system and the user combustion system.

3. A method as defined in claim 1 wherein the reference combustion system and the user combustion system are different systems.

4. A method as defined in claim 1 further comprising, while continuing to operate the user combustion system without a shut-down interruption, correcting the alarm condition and subsequently shifting back from the assured compliance mode to an ordinary mode by increasing the available heat from within the low range to within the target range.

5. A method as defined in claim 1 wherein the low compliant level is not more than 75% of the maximum level.

6. A method as defined in claim 1 wherein the alarm condition is a malfunction of a combustion system component.

7. A method as defined in claim 1 wherein the alarm condition is a fuel composition.

8. A method comprising:
   i) identifying an assured compliance mode of operation for a user combustion system by:
   a) generating exhaust in a preliminary mode by operating a reference combustion system with reactant flow rates that produce available heat;
   b) measuring the available heat generated in the preliminary mode;
   c) measuring a regulated emission parameter of the exhaust generated in the preliminary mode; and
   d) identifying a low range of the measured available heat in which the measured emission parameter is not greater than a specified low compliant level below a maximum level permitted by a governmental regulation; and
   ii) configuring the user combustion system so that the user combustion system is operative to:
   e) generate exhaust in an ordinary mode by operating with reactant flow rates that produce available heat in a target range above the low range;
   f) detect an alarm condition during the ordinary mode; and
   g) while continuing to operate without a shut-down interruption, respond to the alarm condition by shifting from the ordinary mode to the assured compliance mode by reducing the available heat from within the target range to within the low range.

9. A method as defined in claim 8 wherein a single combustion system is operated as the reference combustion system and also is configured as the user combustion system.

10. A method as defined in claim 8 wherein the user combustion system and the reference combustion system are different systems.

11. A method as defined in claim 8 wherein the low compliant level is not more than 75% of the maximum level.

12. A method as defined in claim 8 wherein the alarm condition is a malfunction of a combustion system component.

13. A method as defined in claim 8 wherein the alarm condition is a fuel composition.

14. A method comprising:
   a) identifying a maximum level of a regulated emission parameter permitted by a governmental regulation;

b) specifying a target range of levels of the regulated emission parameter below the maximum level;

c) specifying a low compliant level of the regulated emission parameter below the target range;

d) operating a combustion system to produce exhaust and available heat;

e) measuring the regulated emission parameter of the exhaust;

f) measuring the available heat; and g) identifying a low range of the measured available heat at which the measured emission parameter is not greater than the low compliant level, whereby the low range of available heat corresponds to an assured compliance mode of combustion system operation, wherein the assured compliance mode is entered upon detection of an alarm condition without ceasing operation.

15. A method as defined in claim 14 further comprising the step of specifying a threshold alarm level of the regulated emission parameter below the maximum level and above the target range of levels.

16. A method as defined in claim 14 wherein the low compliant level is not more than 75% of the maximum level.

17. A method as defined in claim 14 further comprising:

h) operating a combustion system in an ordinary mode to produce available heat in a target range of available heat above the low range of available heat, and to generate exhaust with levels of the regulated emission parameter in the target range of levels;

i) detecting an alarm condition during the ordinary mode; and j) while continuing without a shut-down interruption, responding to the alarm condition by shifting from the ordinary mode to an assured compliance mode by reducing the available heat from within the target range of available heat to within the low range of available heat.

18. A method as defined in claim 17 further comprising, while continuing to operate without a shut-down interruption, correcting the alarm condition and subsequently shifting back from the assured compliance mode to an ordinary mode by increasing the available heat from within the low range of available heat to within the target range of available heat.

19. A method as defined in claim 17 wherein the alarm condition is a malfunction of a combustion system component.

20. A method as defined in claim 17 wherein the alarm condition is a fuel composition.

21. A method as defined in claim 14 further comprising the steps of configuring a combustion system to:

h) operate in an ordinary mode to produce available heat in a target range of available heat above the low range of available heat, and to generate exhaust with levels of the regulated emission parameter in the target range of levels;

i) detect an alarm condition during the ordinary mode; and j) while continuing without a shut-down interruption, respond to the alarm condition by shifting from the ordinary mode to an assured compliance mode by reducing the available heat from within the target range of available heat to within the low range of available heat.

22. A method as defined in claim 21 wherein the alarm condition is a malfunction of a combustion system component.

23. A method as defined in claim 21 wherein the alarm condition is a fuel composition.

* * * * *